United States Patent [19]

Riker

[11] 4,290,327
[45] Sep. 22, 1981

[54] HAND TOOL

[76] Inventor: Alton L. Riker, Rte. 1, Box 658, Riverview, Fla. 33569

[21] Appl. No.: 95,615

[22] Filed: Nov. 19, 1979

[51] Int. Cl.³ ............................................. B25B 27/00
[52] U.S. Cl. .................................................... 81/3 R
[58] Field of Search ................. 29/225, 227, 271, 278; 81/3 R

[56] References Cited

U.S. PATENT DOCUMENTS 3,641,657  2/1972  Shufflebarger ..................... 81/3 R X
4,036,473  7/1977  Kloster ............................. 29/227 X Primary Examiner—James G. Smith
Attorney, Agent, or Firm—Arthur W. Fisher, III

[57] ABSTRACT

A hand tool for vertical alignment of coil compression springs in automotive vehicles comprising a coil retaining member including a substantially flat base element having an enlarged convex configuration at one end thereof, a substantially concave coil engaging lip extending downward from the enlarge convex configuration, a reduced coupling element on the opposite end of the substantially flat base and offset vertically thereto in substantially the same plane as the center line of the substantially concave coil engaging lip and a handle member pivotally attached to the reduced coupling element.

2 Claims, 5 Drawing Figures

HAND TOOL

BACKGROUND OF THE INVENTION

1. Field of the Invention

A hand tool for vertical alignment of coil compression springs in automotive vehicles.

2. Description of the Prior Art

A number of prior art devices have been developed and manufactured as various spring coil compression tools. Typical of these are found in U.S. Pat. Nos. 2,646,618; 3,341,075; 3,973,314; 3,051,443; 3,764,107; 4,061,308.

Unfortunately, there is a dearth of hand tools specifically designed and configured for vertical or lateral alignment of coil compression springs in automotive vehicles. Accordingly there remains a real need for such devices.

SUMMARY OF THE INVENTION

The present invention relates to a hand tool for vertical or lateral alignment of a coil compression spring in automotive vehicle frames. Normally in replacing the coil compression spring there is difficulty in aligning the lower portion thereof to the recess of the lower rocker lever.

The hand tool comprises a coil retainer member having a handle member pivotally coupled thereto. More specifically, the coil retaining member comprises a base element having an enlarged arcuate configuration at one end thereof and a reduced coupling element disposed at the opposite end thereof. The enlarged arcuate configuration includes a coil engaging lip extending downwardly therefrom to operatively engage a single convolusion of the coil compression spring. The reduced coupling element is offset vertically downward from the base plate element such as to be substantially in the same plane of the center line of the substantially concave coil engaging lip.

The handle member comprises a coupling member comprising the yoke member disposed on opposite sides of the reduced coupling element whereby a fastening member is extended through apertures formed in each of the yoke members and the reduced coupling element and secured thereto. An open loop fastening member is formed on the opposite end of the cable member by crimping means or fastening means.

In use, the tool is secured to the coil spring by engagement between a single convolusion by the lip. The tool is secured to a come-along spring laterally to seat in recess. The hand tool is then simply removed for future use.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
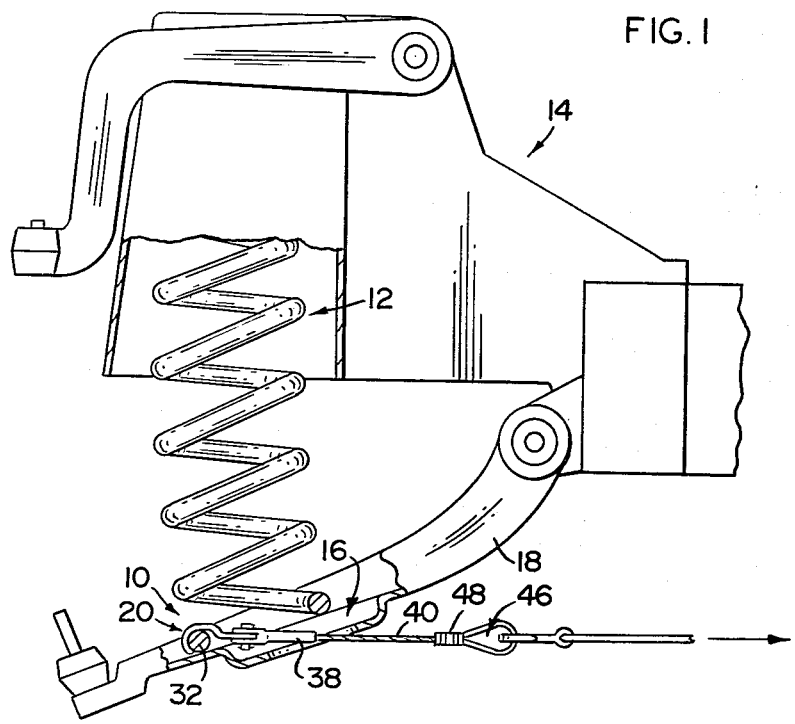
FIG. 1 is a side view of the hand tool in operative relation to a coil compression spring in an automotive vehicle.

As shown in FIG. 1, the present invention relates to a hand tool generally indicated as 10 vertical or lateral alignment of a coil compression spring generally indicated as 12 in automotive vehicle frames generally indicated as 14. Normally in replacing the coil compression spring 12 there is difficulty in aligning the lower portion thereof to the recess 16 of lower rocker lever 18.

Figure 2:
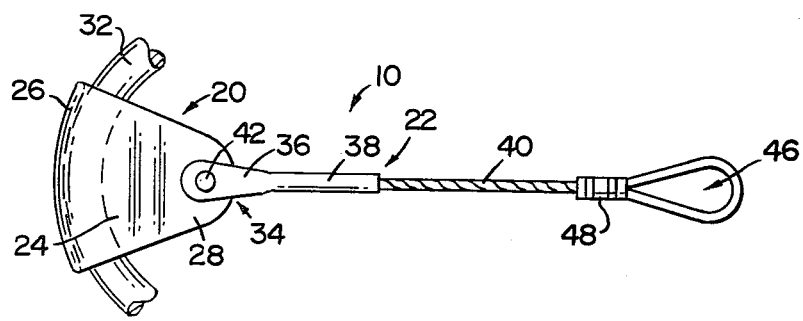
FIG. 2 is a top view of the hand tool.
Figure 3:
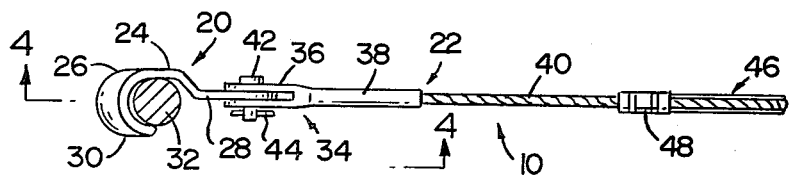
FIG. 3 is a side view of the hand tool.
Figure 4:
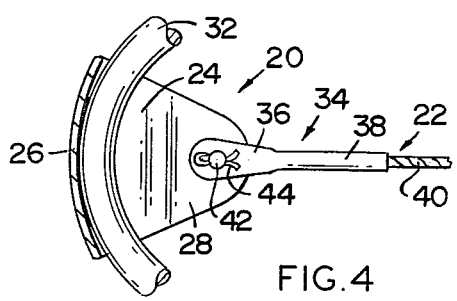
FIG. 4 is a bottom cross sectional view of the hand tool taken along line 4—4 of FIG. 3.

As best shown in FIGS. 2 through 4, the hand tool 10 comprises a coil retainer member generally indicated as 20 having a handle member generally indicated as 22 pivotally coupled thereto. More specifically, the coil retaining member 20 comprises a substantially flat base element 24 having an enlarged arcuate (convex) configuration 26 at one end thereof and a reduced coupling element 28 disposed at the opposite end thereof. The enlarged arcuate or convex configuration 26 includes a substantially concave coil engaging lip 30 extending downwardly therefrom to operatively engage a single convolusion 32 of the coil compression spring 12. It should be particularly noted that the radius of curvature of the convex or arcuate portion 26 and concave coil engaging lip 30 are sufficiently greater than the diameter of the coil 28 and single convolusion 32 respectively to avoid any press locking. Further it should be noted that the reduced coupling element 28 is offset vertically downward from the substantially flat base plate element 24 such as to be substantially in the same plane of the center line of the substantially concave coil engaging lip 30. Thus as more fully described hereinafter this permits a direct line of force on the hand tool to seat the coil compression springs 12 in the recess 16.

The handle member 22 comprises a coupling member 34 comprising an interconnecting substantially Y-shaped yoke 36 having a substantially tubular outer member 38 to accommodate and receive cable member 40. The yoke member 36 are disposed on opposite sides of the reduced coupling element 28 whereby a fastening member such as a bolt 42 or the like is extended through apertures formed in each of the yoke members and the reduced coupling element 26 and secured thereto by a cotter pin 44 or similar device. An open loop fastening member 46 is formed on the opposite end of the cable member 40 by crimping means or fastening means 48.

Figure 5:
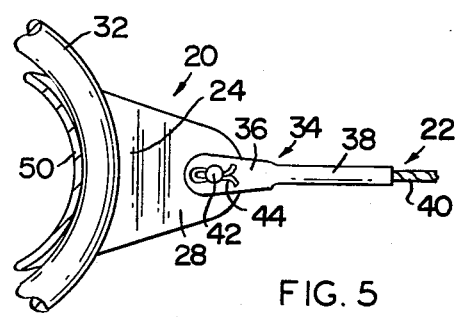
FIG. 5 is a bottom view of an alternate embodiment of the hand tool.

FIG. 5 shows an alternate embodiment of the hand tool 10 comprising substantially the same members and configuration except that the enlarged outer member comprises a concave configuration 50 to receive the inner portion of the coil 32.

In use, the tool 10 is secured to the coil spring 12 by engagement between a single convolusion 32 by lip 30 or 50. The tool 10 is secured to a come-along or other pulling device (not shown) to move the coil spring laterally to seat in recess 16. The hand tool 10 is then simply removed for future use.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A hand tool for vertical alignment of a coil compression spring in automotive vehicles comprising: a coil retaining member specifically configured to engage at least one of the convoluted elements of a coil compression spring and a handle member pivotally coupled to said coil retaining member to laterally adjust the coil compression spring relative to the automotive vehicle, said coil retainer member comprises a substantially flat base having an enlarged substantially convex arcuate configuration formed at one end thereof having a substantially concave coil engaging lip extending downwardly therefrom, wherein the radius of curvature of said coil engaging lip and said enlarged substantially convex arcuate configuration are greater than the diameter of the convoluted element and the coil compression spring respectively, said coil retaining member further includes a reduced coupling element formed at the opposite end of said flat base, said reduced coupling element is offset vertically relative to said substantially flat base and in substantially the same plane as the center line of said substantially concave coil engaging lip.

2. The hand tool of claim 1 wherein said handle member comprises a yoke pivotally attached to said coil retaining member interconnecting a fastening means by means of flexible cable.

* * * * *